United States Patent
Wilds et al.

(10) Patent No.: US 8,844,147 B2
(45) Date of Patent: Sep. 30, 2014

(54) TILT-ANGLE COMPENSATED STEERING WHEEL ANGLE GAUGE

(75) Inventors: John Wesley Wilds, Trenton, MI (US); Michael George Lysenko, Canton, MI (US); Bruce C. Arnold, Whitmore Lake, MI (US); John Keller, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 309 days.

(21) Appl. No.: 13/409,118

(22) Filed: Mar. 1, 2012

(65) Prior Publication Data

US 2013/0227848 A1  Sep. 5, 2013

(51) Int. Cl.
*G01C 9/00* (2006.01)
*G01B 5/25* (2006.01)
*G01C 9/02* (2006.01)

(52) U.S. Cl.
CPC ... *G01B 5/25* (2013.01); *G01C 9/02* (2013.01)
USPC .............................. 33/301; 33/645

(58) Field of Classification Search
CPC ........ G01B 5/25; G01B 5/255; G01B 5/0025; G01B 11/2755; G01B 7/00; G01B 21/26; G01C 9/02; G01C 9/08; G01C 9/12; G01C 9/28; G01C 17/00; G01C 17/38
USPC .................... 33/1 N, 645, 600, 613, 203, 333
See application file for complete search history.

(56) References Cited

U.S. PATENT DOCUMENTS

| 3,889,527 | A | * | 6/1975 | Wallace | 33/203 |
| 4,721,008 | A | * | 1/1988 | Stoops et al. | 74/552 |
| 5,105,546 | A | * | 4/1992 | Weise et al. | 33/203.12 |
| 5,781,286 | A | * | 7/1998 | Knestel | 33/203.18 |
| 5,919,238 | A | * | 7/1999 | Lavey | 33/203 |
| 6,076,269 | A | * | 6/2000 | Sekino et al. | 33/371 |
| 6,726,228 | B2 | * | 4/2004 | Crawford | 280/86.75 |
| 6,948,259 | B1 | * | 9/2005 | Hatfield et al. | 33/645 |
| 7,036,240 | B1 | * | 5/2006 | Hatfield et al. | 33/600 |
| 7,152,333 | B1 | * | 12/2006 | Chou | 33/203.18 |
| 7,318,287 | B1 | * | 1/2008 | Hatfield et al. | 33/600 |
| 7,581,324 | B1 | * | 9/2009 | Rogers | 33/203 |
| 7,681,322 | B1 | * | 3/2010 | Pruitt et al. | 33/203.18 |
| 8,517,422 | B2 | * | 8/2013 | Zaloga et al. | 280/775 |
| 2003/0159303 | A1 | * | 8/2003 | Crawford | 33/645 |
| 2013/0190969 | A1 | * | 7/2013 | Harrill et al. | 701/34.4 |
| 2013/0227848 | A1 | * | 9/2013 | Wilds et al. | 33/301 |

* cited by examiner

*Primary Examiner* — Yaritza Guadalupe-McCall
(74) *Attorney, Agent, or Firm* — Joseph E. Root

(57) ABSTRACT

An alignment tool for a steering wheel, where the steering wheel is mounted on a steering column and the tool is configured to attach to the steering wheel. The tool includes a wheel orientation mechanism including a first tilt sensor, reporting a clockwise angle of the steering wheel, and a tilt monitoring mechanism that includes a second tilt sensor to report a tilt angle of the steering column.

9 Claims, 2 Drawing Sheets

TILT-ANGLE COMPENSATED STEERING WHEEL ANGLE GAUGE

BACKGROUND

This application generally relates to the field of gauging steering wheel variations during a wheel alignment inspection procedure, and, more particularly, relates to gauging the steering wheel alignment with the help of an alignment tool.

Currently employed steering wheel tools, known as angle tools or leveling tools, used for providing feedback in high-volume production wheel alignment machines, provide a feedback of the steering wheel's position only according to the steering wheel's rotation in relation to a straight-up position, generally referred to as the 12 o'clock position. Such feedback is used to confirm that the steering wheel position corresponds to the position of the road wheels, in order to provide the tires with ideal tire wear characteristics, and to improve vehicle operator comfort.

With the steering wheel mounted on a tiltable steering column, it has however been observed that the steering system may cause, because of loose column tolerances, a clocking or rotation of the steering wheel as a result of a change in the tilt in the steering column. Some vehicle models may, for example, exhibit a change in steering wheel angle of over 3°, when a steering column is tilted from full-down to a full-up position, or vice-versa. Such conditions affect the accuracy of the steering wheel and road wheel alignment process.

Additionally, certain studies have concluded that customer complaints will result from a steering wheel that deviates off from the 12 o'clock position by 1.5° or more, in relation to a straight-leveled drive.

A solution desirable for floor inspectors and quality testers to ascertain a corrected steering wheel alignment in relation to the road wheels is discussed in the present disclosure.

SUMMARY

One embodiment of the present application describes an alignment tool for a steering wheel, the steering wheel being mounted on a steering column, and the tool being configured to be attached to the steering wheel. The tool includes a wheel orientation mechanism including a first tilt sensor to report a clockwise angle of the steering wheel, and a tilt monitoring mechanism including a second tilt sensor to report a tilt angle of the steering column.

Another embodiment of the present disclosure describes a steering wheel alignment tool, the steering wheel mounted on a steering column. The steering wheel alignment tool includes a clamp, configured to attach the alignment tool to the steering wheel. The clamp further includes at least one arm to mount the alignment tool to a steering wheel's rim. A wheel orientation mechanism configured within the tool includes a first tilt sensor to report a clockwise angle of the steering wheel, and a tilt monitoring mechanism, also configured within the tool, includes a second tilt sensor to report a tilt angle of the steering column. A controller, that has a memory, is configured to be connected to both the first tilt sensor and the second tilt sensor.

Certain embodiments of the present disclosure describe a tool that aligns a steering wheel. A steering column mounts the steering wheel. In particular, the tool includes a clamp, configured to attach the tool to the steering wheel, the clamp including at least one arm to mount the alignment tool to the steering wheel's rim. The alignment tool includes a wheel orientation mechanism that includes a first tilt sensor, reporting a clockwise angle of the steering wheel, and a tilt monitoring mechanism that includes a second tilt sensor, reporting a tilt angle of the steering column. A controller connected to the first tilt sensor and the second tilt sensor, includes a memory that further includes a software installed to correct the clockwise angle of the steering wheel, reported by the first sensor, according to a variance in the tilt of the steering column reported by the second tilt sensor.

BRIEF DESCRIPTION OF THE DRAWINGS

The figures described below set out and illustrate a number of exemplary embodiments of the disclosure. Throughout the drawings, like reference numerals refer to identical or functionally similar elements. The drawings are illustrative in nature and are not drawn to scale.

DETAILED DESCRIPTION

The following detailed description is made with reference to the figures. Exemplary embodiments are described to illustrate the subject matter of the disclosure, not to limit its scope, which is defined by the appended claims.

Overview

In general, the present disclosure describes methods and systems for gauging steering wheel alignments during high-volume production alignment procedures for vehicular road wheels. To this end, a set of tilt sensors, two in number, are included in a portable tool, the tool being configured to be attached to the steering wheel. The first tilt sensor gauges and reports a clockwise angle of the steering wheel, and the second tilt sensor gauges the tilt orientation of a steering column onto which the steering wheel is mounted. To obtain the closest possible and most accurate alignment of the steering wheel with the road wheels, feedbacks from both the inclinometers are obtained and fed to alignment software. A consequent processing of such feedbacks results in a nominally positioned steering wheel at a predetermined tilt angle.

Exemplary Embodiments

Figure 1A:
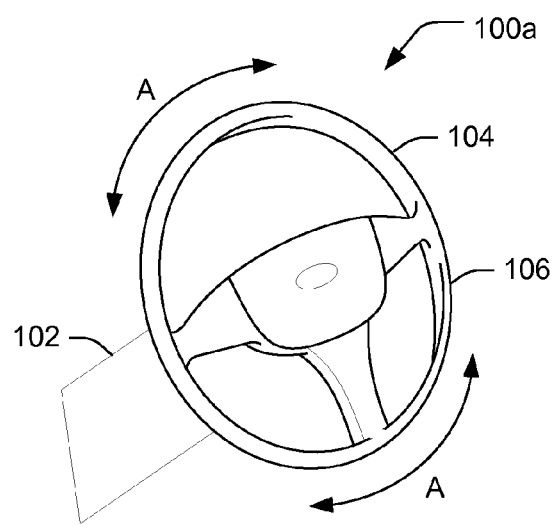
FIG. 1A is a schematic of a steering wheel configured to rotate according to the present disclosure.

FIG. 1A illustrates an exemplary and conventionally applied steering system 100a in a vehicle (not shown). As is known in the art, the steering system 100a includes a steering wheel 104 and a steering column 102. The steering wheel 104, as shown, is mounted on the steering column 102, and further comprises a steering wheel rim 106.

More particularly, the figure depicts a rotary action of the steering wheel 104, depicted through arrows A. The steering wheel 104, through the steering column 102, being connected to a set of road wheels (not shown), enables a vehicle driver (not shown) to control vehicular directions and maneuvers during a vehicular motion. The position of the steering wheel 104, as depicted, is in a 12 'O' clock position, is conventionally known as the position that enables the vehicle to go in a straight line.

Figure 1B:
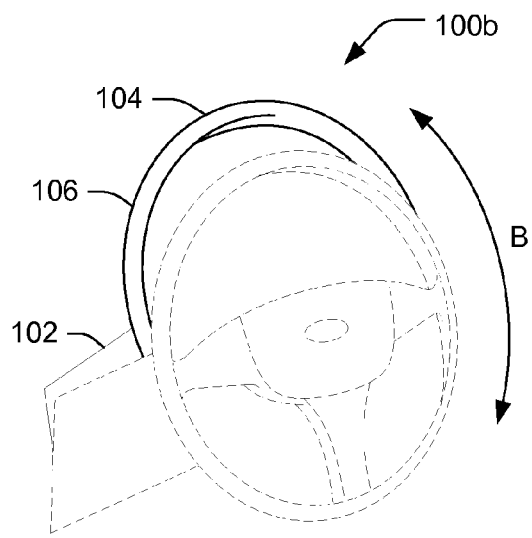
FIG. 1B is a schematic of a steering wheel configured to tilt according to the present disclosure.

FIG. 1B illustrates an application 100b of the steering system 100a, exhibiting a tilt action of the steering column 102, depicted through an arrow B, as shown. In conventional practices a tilt, such as the one shown, enables a vehicle driver to conveniently position the steering wheel 104 and attain an ergonomic driving posture. More particularly, in addition to providing mounting for the steering wheel 104, the steering column 102 also provides mountings for multi-functional switches, column lock, column wirings, gear selectors, gauges or instruments for speed and RPM (rotations per minute) displays, other units found in EPAS (Electric Power Assist Steering), etc. Such steering columns may also enable dissipation of energy during a front-end collision. The mentioned systems and configurations, also being well known in the art, will not be discussed further.

The steering wheel 104, mounted on the steering column 102, rotates in relation to the steering column 102. Certain procedures are carried out during a vehicle manufacturing process that sets out directions to align the steering wheel 104 to the road wheels of the vehicle. Accordingly, a rotation of the steering wheel 104 is configured to be detected through currently applied steering wheel leveling tools. Such leveling tools, comprise a tilt sensor, more particularly an inclinometer, which measures the angle of rotation of the steering wheel 104, the angle of rotation being both clockwise and counter-clockwise. The measured value, subsequently obtained through the inclinometer, is fed to an alignment algorithm or a software as a feedback that enables a controller to interacts with the road wheels through alignment machines. A set of high-resolution cameras are included along with the alignment machines that allow accurate tracking of the road wheels' orientation. The alignment machines eventually enable a correction in the alignment of the road wheels in relation to the steering wheel 104. As an example, if the steering wheel 104 is positioned with a 5° tilt in relation to the 12 'O' clock position, the leveling tool reads this tilt through the inclinometer and subsequently feeds the alignment software with the rotated value, the value being 5°. Further, the leveling tool incorporates the 5° rotation of the steering wheel 104 in the alignment software, the alignment software being configured to be installed in a memory in a controller. Consequently, the rotation of the steering wheel 104 is accounted for, during an alignment of the steering wheel 104 with the road wheels.

A deviation in the rotation of the steering wheel 104, as noted above, during modern wheel alignment practices is however not alone a factor that accounts for a balanced wheel alignment. As discussed earlier in this disclosure, the steering column 102 exhibits a tilt action B, as shown in FIG. 1B, as well, that has been observed to add an imbalance in accurate positioning and alignment of the road wheels according to the steering wheel 104. As stated, a rotation or a clocking action of the steering wheel 104 is observed when the steering column 102 varies through the column's tilt range in a vehicle.

A primary aspect of the present application discloses a secondary tilt sensor, configured as a second inclinometer, along with a first inclinometer. The first inclinometer is configured to measure and report a clockwise or a counter clockwise angle of the steering wheel 104, whereas, the second inclinometer is configured to measure and report a tilt angle of the steering column 102. A steering wheel alignment methodology, enabled through the second inclinometer, as noted, has been discussed in the forthcoming disclosure.

Figure 2:
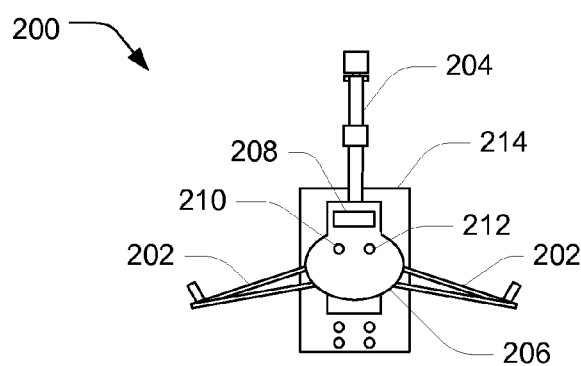
FIG. 2 is an exemplary steering wheel angle-gauging tool according to the present disclosure.

FIG. 2, accordingly, depicts an exemplary steering wheel alignment tool 200, comprised with a second inclinometer 212, along with a first inclinometer 210, as mentioned above, configured to gauge an alignment of the steering wheel 104 and steering column 102. The first inclinometer 210 forms a part of a wheel orientation mechanism, and the second inclinometer 212 forms a part of a tilt monitoring mechanism, both mechanisms being a part of functionalities that respectively gauge clockwise and anticlockwise rotation of the steering wheel 104, and a tilt in the steering column 102. In structure, the tool 200 includes arms 202, accompanied by a spring-loaded hook arm 204, all configured to attach to the steering wheel 104 at the rim 106. Further, the tool 200 includes a controller 206, the controller 206 configured to include a memory 208, as well.

The arms 202 form clamps for attaching the tool 200 to the steering wheel rim 106, and are made from a rigid material, for example, steel or high grade plastic, but are flexible enough to enable a single person to accommodate and attach the tool 200 on the steering wheel rim 106, as shown. The spring loaded hook arm 204, on the other hand, is configured in such a way that attachment of the tool 200 to steering wheel rims of multiple sizes becomes possible. Designs and configurations of such flexible arms 202, that are configured to attach and clamp similar tools to a steering wheel rim, such as the rim 106, are well known to a person skilled in the art, and thus will not be discussed further in the application.

Inclinometers 210 and 212 are standard tilt sensors, applied widely in the art, being applied for a varied set of applications. The specifications of the inclinometers 210 and 212, thus, will not be discussed further.

One part of the tool 200 includes a controller 206, housed within an enclosure 214. As is known in conventional applications, the controller 206 may be a microprocessor based device that includes a CPU, enabled to process the incoming information from a known source. Further, the controller 206 may be incorporated with volatile memory units, such as a RAM and/or ROM, that function along with associated input and output buses. The controller 206 may also be optionally configured as an application specific integrated circuit, or may be formed through other logic devices that are well known to the skilled in the art. More particularly, the controller 206 may either be formed as a portion of an externally applied electronic control unit, or may be configured as a stand-alone entity. One portion of the controller 206 is configured to be connected to both the inclinometers 210 and 212, while another portion is configured to be connected to the leveling tools (not shown), that are configured to interact and align the road wheels.

The memory 208 is disposed within the controller 206, and may include volatile and non-volatile storage regions that stores information related to the overall functioning of the tool 200. The memory 208 may particularly record information related to the sensed rotation or tilt, configured to be provided to the alignment software as feedback, over the volatile medium for feeding the sensed information to the controller 206. The non-volatile region the memory 208 can be configured to include predetermined tensioning values of the arms 202, specifications of the hook arm 204, maximum and minimum workable temperature, maximum and minimum battery life. Further, the memory 208 may also include angle conversions data, configured to convert the read values of rotation and tilt into compatible language for the alignment software, specifications of the tool 200, memory 208, controller 206, the arms 202, hook arm 204, etc. More particularly, the memory 208 is configured to include the alignment algorithm or the software, the alignment software being configured to run on an empirical formula. The empirical formula, as stated, is adapted to enable compensatory value of the sensed rotation or tilt to be provided to the leveling tools, enabling the leveling tools to configure the road wheels according to a consequent output obtained from the controller 206. Accordingly, the software is thus adapted to correct the clockwise angle of the steering wheel 104, reported by the first inclinometer 210, in relation to a variance in the tilt of the steering column 102, reported by the second inclinometer 212.

Further, the tool 200 is configured to include a high-life rechargeable battery that allows the device to be portable over a shop floor area.

Currently, process discipline is the only means to accomplish an accurate wheel alignment process. During vehicle assembly operations, an operator or a worker may enter a vehicle to check whether all required operations have been carried out successfully. Such an entry may however require the operator to adjust the tilt column of the vehicle's steering wheel 104 for an easy ingress and egress. As noted above, such change in tilts in the steering column 102, caused either because of such random checks, or other possible reasons, may result in imbalances of the steering wheels during a wheel alignment process. To counter such conditions, arising out during manufacturing or assembly operations, the tool 200 is attached (shown in FIG. 3) over a vehicle's steering wheel, during a wheel alignment and inspection process, to monitor the state of the steering wheel 104 in relation to the road wheels.

In operation, an operator or a floor worker attaches the tool 200, configured with two inclinometers 210 and 212, to the steering wheel 104. Following the attachment, and upon activation, through a switch or a knob (not shown), or through other means, the tool 200 first senses the rotation of the steering wheel 104 in relation to the 12 'O' clock position, through the first inclinometer 210, obtaining a first tilt value. Alongside the first inclinometer 210, the second inclinometer 212 senses and measures the tilt angle of the steering column 102 as well, obtaining a second tilt value. Both these sensed values are further fed into the controller 206. The controller 206, upon receiving these values, processes them, to obtain a processed value, through the installed alignment software, and further enables the controller 206 to interact with the alignment machines, also connected to the controller 206, to track the road wheels, enabling them to attain an accurate alignment with the steering wheel 104. As stated earlier, the alignment machines, comprising high-resolution cameras, allow tracking of the road wheels, assisting the operators and workers to achieve an accurate alignment. Accordingly, the clockwise angle of the steering wheel 104 is corrected according to the processed value, in relation to a variance in the tilt of the steering column 102, reported by the second inclinometer 212.

As an example, during an inspection process, if the steering wheel 104 is sensed to have rotated 0.5° in the clockwise direction, and if a 15° tilt of the steering column 102 adds another 0.2 to the overall tilt, also in the clockwise direction, the resultant reading provided to the alignment software is 0.7°. It is understood that the alignment software, based on the empirical formula, as stated earlier, would be having calculations in place to establish the amount of rotation observed in the steering wheel 104, based on the sensed tilt of the steering column 102. All such calculations and the corresponding empirical formulas are configured to be stored within the memory 208. In such a manner, a more accurate wheel alignment method is established, that accounts for the tilt of the steering column 102, as well.

In an embodiment, the second inclinometer 212 within tool 200, set out above, may also be configured to provide a feedback to the alignment software, notifying that the steering wheel 104 is not in a correct position. Such feedback may be configured in an audible format or a visual format as well. In particular, such feedback would also require a speaker connected to the controller 206 to audibly transfer the notification to an operator, or through a visual display, having similar connections, in order to visually transfer such information. An example, set out below, aids in understanding such an embodiment.

The tool 200, incorporated with the second inclinometer 212, can be configured in the wheel alignment inspection processes, to gauge an angle of tilt of the steering column 102, to be maintained at a constant fixed value at all times, for all inspections. For a particular vehicle model, if the wheel alignment inspection procedure requires the angle of tilt of the steering column 102 to be at a fixed, predetermined angle of 10°, in relation to the lowermost position of the tilt of the steering column 102, the second inclinometer 212 could help establish such pre-requisites. In particular, when the steering column 102 is not at the predetermined 10°, an audible or a visual error message, or a feedback could alternatively be provided to an operator, inspecting the wheels for an alignment correction, alerting the operator to re-configure the steering column 102 to the predetermined position, at the constant 10° angle of the steering column 102. Further, when such an error occurs, one could also adjust the reading, provided by the first inclinometer 210, to be provided to the alignment software to achieve a nominally aligned state of the steering wheel 104.

Figure 3:
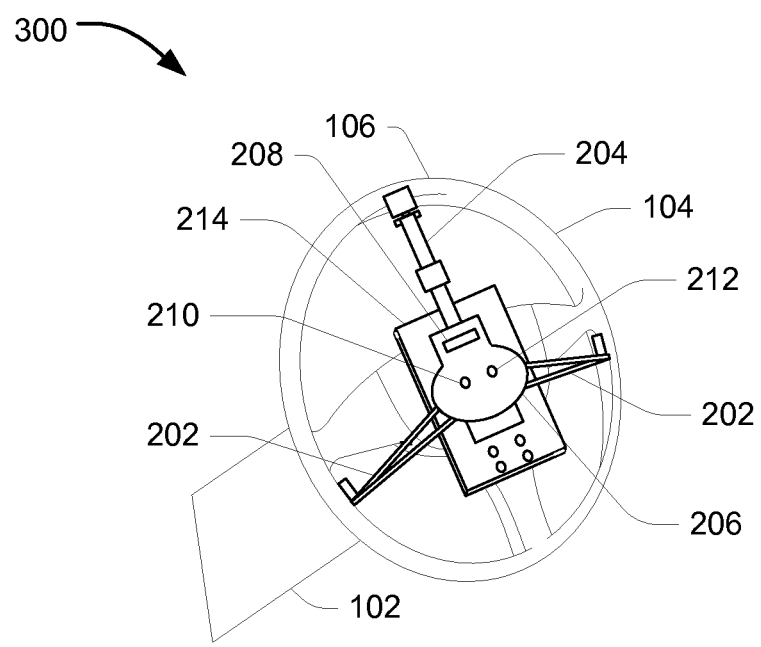
FIG. 3 illustrates an exemplary application of the steering wheel angle-gauging tool on a steering wheel according to the present disclosure.

FIG. 3 depicts an application 300, of the tool 200 attached over the steering wheel 104. As noted earlier in the application, the arms 202 and the spring-loaded hook arm 204 attaches to the steering wheel rim 106. Such clamping of the tool 200, to the steering wheel rim 106, enables an accurate gauging of a state of the steering wheel 104, according to the angle the steering wheel 104 makes in relation to the 12 'O' clock position, and the angle the steering column 102 makes by varying in the tilt range. The tool 200, being portable and compact, as depicted, makes the process of steering wheel alignments and inspections processes more robust and quick on a conventional shop floor.

Certain shop floor practices may also include the tool 200 to transmit tilt angle information to a database configured over a central server, every time the tool 200 is applied on a vehicle model. The database may track records of misalignment data, extent of error occurred, operators involved, etc., helping identify errors related to the steering wheel 104, steering column 102, other fixtures and fasteners employed in the steering system, eventually aiming to address re-occurring problems in manufacturing or design.

It will be understood that all methodologies applied over similarly disclosed steering wheels, gauging the state of the steering wheel through a set of at least two tilt sensors, would be covered under the scope of the present disclosure as well.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

We claim:

1. An alignment tool for a vehicle steering wheel mounted on a tiltable steering column, comprising:
   a first tilt sensor, positioned and adapted for sensing a physical rotation angle of the steering wheel;
   a second tilt sensor, positioned and adapted for sensing a tilt angle of the steering wheel;

a controller, in electrical communication with the first and second tilt sensors, including
  memory, for storing selected data;
  a processor; and
  a communications module;
arms adapted for positioning the alignment tool on the steering wheel in a selected position;
wherein the processor calculates and the communications module communicates a compensated rotation angle of the steering wheel.

2. The alignment tool of claim 1, wherein the first tilt sensor and the second tilt sensor are inclinometers.

3. The alignment tool of claim 1 further comprising a wheel alignment system for performing wheel alignment operations on road wheels of the vehicle.

4. The alignment tool of claim 3, wherein software is installed in the memory in the controller, the software configured to correct the reported clockwise angle of the steering wheel, the clockwise angle corrected by a variance in the tilt angle of the steering column.

5. The alignment tool of claim 1, wherein the arms further include a clamp, configured to engage the steering wheel.

6. A method of aligning a vehicle steering wheel mounted on a tiltable steering column, the method comprising:
  sensing a clockwise angle of the steering wheel, employing a first tilt sensor to obtain a first tilt value;
  sensing a tilt of the steering column employing a second tilt sensor to obtain a second tilt value;
  inputting the first tilt value and the second tilt value to a controller;
  processing the first tilt value and the second tilt value employing software installed in the controller, to obtain a compensated value of steering wheel rotation.

7. The method of claim 6, further comprising communicating the compensated value to a system for aligning the vehicle road wheels.

8. In a system for aligning the road wheels of a vehicle, the improvement comprising:
  an alignment tool for a vehicle steering wheel mounted on a tiltable steering column, the alignment tool including:
    a first tilt sensor, positioned and adapted for sensing a physical rotation angle of the steering wheel;
    a second tilt sensor, positioned and adapted for sensing a tilt angle of the steering wheel;
    a controller, in electrical communication with the first and second tilt sensors, including
      memory, for storing selected data;
      a processor; and
      a communications module;
    arms adapted for positioning the alignment tool on the steering wheel in a selected position;
    wherein the processor calculates and the communications module communicates a compensated rotation angle of the steering wheel to the system for aligning the road wheels.

9. The improved system of claim 8, wherein the first and second tilt sensors are inclinometers.

\* \* \* \* \*